United States Patent
Arnold et al.

(12) 
(10) Patent No.: US 10,980,175 B2
(45) Date of Patent: Apr. 20, 2021

(54) AGRICULTURAL APPARATUS FOR COMMINUTION OF BIOMASS

(71) Applicant: Müthing GmbH & Co. KG, Winterberg (DE)

(72) Inventors: Martin Arnold, Steinlah (DE); Hubertus Löer, Anröchte-Uelde (DE); Michael Müthing, Winterberg (DE)

(73) Assignee: Müthing GmbH & Co. KG, Winterberg (DE)

(*) Notice: Subject to any disclaimer, the term of this patent is extended or adjusted under 35 U.S.C. 154(b) by 145 days.

(21) Appl. No.: 16/113,234

(22) Filed: Aug. 27, 2018

(65) Prior Publication Data

US 2019/0059216 A1 Feb. 28, 2019

(30) Foreign Application Priority Data

Aug. 30, 2017 (DE) .................. 10 2017 008 126.3

(51) Int. Cl.
| | | |
|---|---|---|
| *A01D 43/08* | (2006.01) | |
| *A01F 29/09* | (2010.01) | |
| *A01D 34/43* | (2006.01) | |
| *A01D 34/835* | (2006.01) | |

(52) U.S. Cl.
CPC ......... *A01D 34/8355* (2013.01); *A01D 43/08* (2013.01); *A01F 29/095* (2013.01)

(58) Field of Classification Search
CPC ........ A01B 33/02; A01D 34/82; A01D 34/42; A01D 34/62; A01D 34/00; A01D 34/005; A01D 34/835; A01D 34/8355; A01D 34/435; A01D 43/08; A01D 45/30; A01D 45/06; A01D 45/065; A01F 29/095; A01F 29/01

See application file for complete search history.

(56) References Cited

U.S. PATENT DOCUMENTS

| | | | | | |
|---|---|---|---|---|---|
| 2,517,855 | A | * | 8/1950 | Elliott | A01D 34/005 56/251 |
| 3,409,088 | A | * | 11/1968 | Lindbeck | A01B 33/02 172/66 |
| 3,906,710 | A | * | 9/1975 | Pask | A01D 34/28 56/10.2 E |
| 4,190,209 | A | * | 2/1980 | deBuhr | A01F 29/095 241/101.762 |
| 4,335,569 | A | * | 6/1982 | Keeney | A01D 34/42 56/10.2 R |
| 4,479,346 | A | * | 10/1984 | Chandler | A01D 34/42 241/37 |

(Continued)

FOREIGN PATENT DOCUMENTS

| | | |
|---|---|---|
| DE | 33 22 514 A1 | 1/1985 |
| DE | 697 12 863 T2 | 1/2003 |

(Continued)

*Primary Examiner* — Adam J Behrens
(74) *Attorney, Agent, or Firm* — McGlew and Tuttle, P.C.

(57) ABSTRACT

An agricultural working apparatus, for the separation of ground vegetation, in particular a mulching, mowing or a milling apparatus, includes at least one cutting device, having a cutting rail, and at least one adjusting device for the adjustment of the cutting rail. The cutting device has at least one connecting piece, which is arranged laterally in the transverse direction and by means of which the cutting rail is connected to the adjusting device.

23 Claims, 13 Drawing Sheets

(56) References Cited

U.S. PATENT DOCUMENTS

| | | | | |
|---|---|---|---|---|
| 4,606,178 A | * | 8/1986 | Saiia | A01D 34/62 |
| | | | | 241/241 |
| 5,203,151 A | * | 4/1993 | Mills | A01D 34/54 |
| | | | | 172/427 |
| 5,477,666 A | * | 12/1995 | Cotton | A01D 34/62 |
| | | | | 56/251 |
| 6,941,827 B2 | * | 9/2005 | Krone | F15B 15/2846 |
| | | | | 73/865.9 |
| 7,631,479 B2 | * | 12/2009 | Thier | A01D 34/62 |
| | | | | 56/249 |

FOREIGN PATENT DOCUMENTS

| | | | | |
|---|---|---|---|---|
| EP | 2 997 802 A1 | | 3/2016 | |
| EP | 2997802 A1 | * | 3/2016 | A01B 33/02 |

* cited by examiner

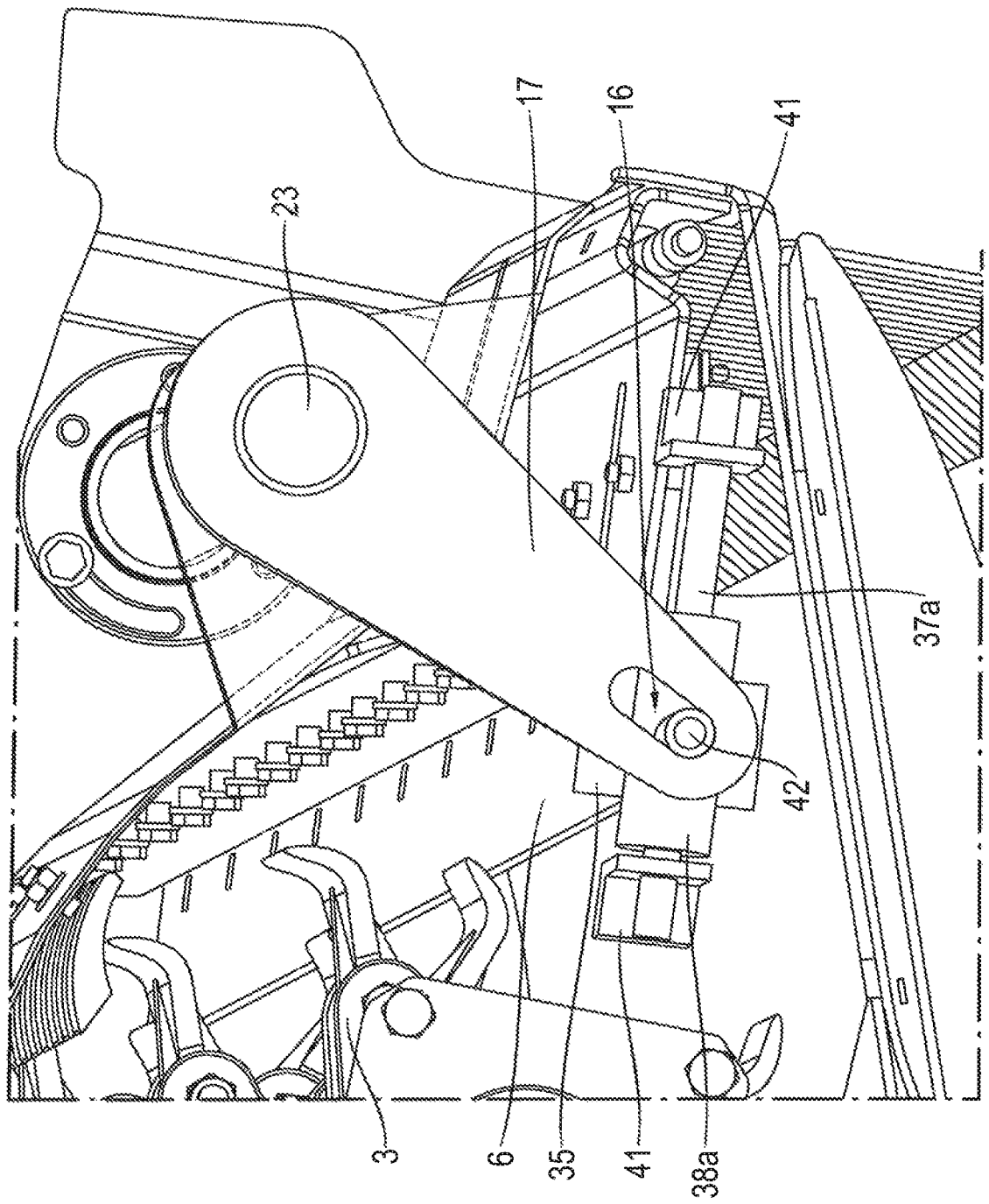

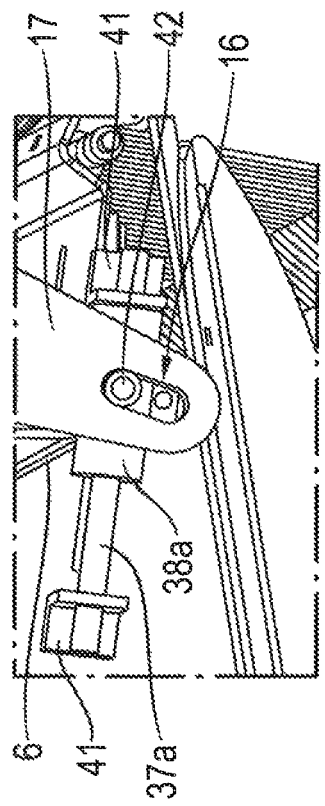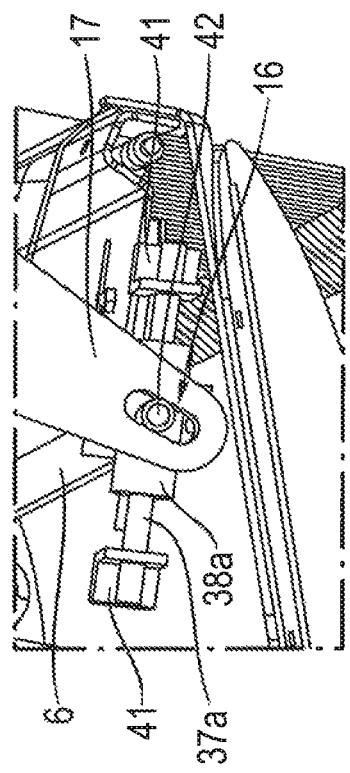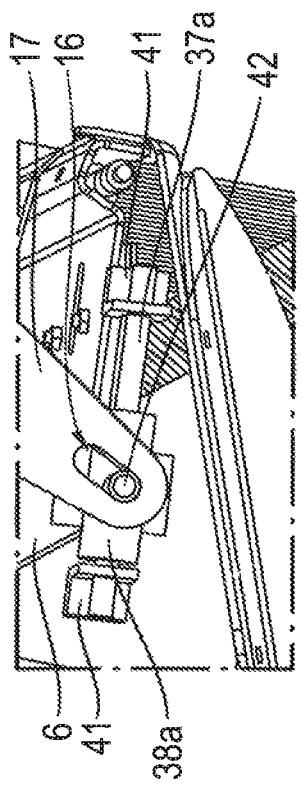

AGRICULTURAL APPARATUS FOR COMMINUTION OF BIOMASS

CROSS REFERENCE TO RELATED APPLICATIONS

This application claims the benefit of priority under 35 U.S.C. § 119 of German Application 102017008126.3, filed Aug. 30, 2017, the entire contents of which are incorporated herein by reference.

TECHNICAL FIELD

The invention relates to an agricultural working apparatus for the processing of biomass such as plant parts, in particular a mulching, a mulching-mowing, or a milling apparatus, comprising at least one cutting device, which has at least one cutting rail, and comprising at least one adjusting device for the adjustment of the cutting rail.

BACKGROUND

Such agricultural working apparatuses for the processing of biomass, in particular plant parts, for the separation and comminution of ground vegetation, such as grass, but also plant stubbles, are widely used as separating and comminuting apparatuses, in particular as mulching, mulching-mowing apparatuses or rotary cultivators, inter alia in fallow land and landscape management, as well as in agriculture. They are used there for the mowing and comminution of plant growth, plant remnants and biomass of widely varied type, such as, for instance, grass, catch crops, plant stubbles of grain, rape, corn, branches or bushes. This is separated off from the soil by the working apparatuses, collected, commminuted by a working rotor of the working apparatus, and fed back to the soil. Due to its nature, the dissected and distributed plant material on the ground rapidly decays on the ground. It hence serves as fertilizer for the soil, for humus formation and for field hygiene measures.

Working apparatuses of this type have, in addition to the working rotor, a cutting unit having at least one cutting rail, the latter being arranged at a distance from the working rotor within the housing of the working apparatus. The distance between the cutting rail and the working rotor forms a gap, which primarily determines the size and form of the comminuted plant material. In most working apparatuses from the prior art, the cutting rail, together with the cutting device, is arranged fixed in place within the housing of the working apparatus. An adaptation to different lengths of cut and distances from the working rotor is therefore not possible.

Individual working apparatuses of the stated type, in which the cutting device or the cutting rail can be manually adjusted by the user, are known. For this purpose, fastening elements which hold the cutting device on the housing of the working apparatus are firstly released. After this, the cutting device or the cutting rail is shifted and reattached to the housing of the apparatus by means of the fastening elements. In the case of frequently changing circumstances, for instance changes in plant mass or biomass or in the quantity, density, moisture contents or soil conditions, or in the case of changes in the weather, this process is very laborious and allows no dynamic adaptation of the cutting device during operation of the apparatus. Moreover, the space in the interior of the housing is so greatly limited that individual components arranged in the working path of the ground vegetation to be comminuted substantially disturb the workflow.

SUMMARY OF THE INVENTION

An object of the invention lies in remedying the stated drawbacks and refining said working apparatus to the effect that an adjustability, in particular a continuous adjustability, of the cutting device is enabled in the work process, in a manner controllable by a user, at the same time as a low spatial requirement is given.

The object is achieved with a working apparatus having the features of the invention. This apparatus is characterized in that the cutting device has at least one connecting piece, which is arranged laterally in the transverse direction and by means of which the cutting rail is connected to the adjusting device.

Through the inventive design of an apparatus of the generic type, it is, in particular, achieved that this apparatus, besides the previous function of separating off, collecting, conveying, processing, treating, comminuting and shredding fixed biomass still connected to the root, i.e. plants, can advantageously also be used for the appropriate aforementioned processing of already separated biomass lying on the ground surface, i.e. plant parts and plant remnants, such as vegetation, plants, plant remnants, plant stubble, plant growth, grass, bushes, branches and biomass of all types.

The invention is based on the consideration that, in the middle region of the apparatus, components thereof for connection to a towing carriage vehicle are present. As a result of the arrangement of the connecting piece on a transverse side of the apparatus, the connecting components do not have to be altered; hence, at the same time, a defined point of application for the adjustment of the cutting device is created. The connecting piece can here be arranged on the top side and/or bottom side of the cutting edge, and/or on the side faces, pointing toward the respective transverse sides, of the cutting rail.

"Transverse direction" denotes, within the meaning of the invention, that direction which lies in the horizontal perpendicular to the direction of travel of the working apparatus. The vertical direction is perpendicular to both the direction of travel and the transverse direction.

The cutting device of the apparatus according to the invention can have at least one, in particular plate-shaped, mounting, which is connected to the cutting rail. A fundamental effect of the invention is the adjustability of the cutting rail. By means of a mounting, the necessity of having to directly drive the cutting rail is hence eliminated. The cutting rail is held by a mounting. The mechanical stability of the cutting rail is in this way increased. Preferably, a plurality of mountings, relative to which the cutting rail is movable, can be provided in order to reduce the mechanical load upon the cutting rail per unit of space in consequence of the adjustment. In particular, the cutting rail, due to the mounting, is fixed in the vertical direction and transverse direction relative to the housing of the apparatus.

In an advantageous embodiment, the connecting piece has a bolt, which is fixed on the cutting rail and which engages in a depression, in particular in a recess of the adjusting device. The bolt creates a simple connection facility to a drive for the swivel rail, which connection facility ensures the transmission of the forces necessary for the adjustment of the cutting rail.

In order to minimize wear effects and enable smooth controlling of the cutting device, in the depression a sliding block can be arranged between the bolt and the adjusting device. The sliding block within the meaning of the invention is distinguished, in particular, by the fact that the bolt is movable in the depression of the adjusting device with as little friction as possible. The base area of the sliding block can here be configured in dependence on the geometric shape of the depression and, in particular, can be, polygonal or round.

In an advantageous embodiment, between the bolt and the sliding block is arranged a spring element, which in particular is an elastic border, surrounding the sliding block, of same. For this purpose, the spring element has an elastic material, so that a part of the force transmitted from the adjusting device to the bolt is converted into a reversible deformation of the spring element. A tilting of the cutting rail is hereby avoided.

Instead of or in addition to the configuration of the bolt, the connecting piece can have at least one adapter plate, which is connected to the adjusting device. The adapter plate can be arranged with its surface in particular perpendicular to the surface of the cutting rail and creates, in particular in this embodiment, a larger connecting surface to the adjusting device. The adapter plate can here be connected to the adjusting device by means of screws, bolts and/or rivets. The connection between the adapter plate and the adjusting device can be configured to be releasable in order to perform maintenance works or adjustments particularly easily by hand.

The connecting piece can have at least one actuating cylinder having a piston, which, by means of the adapter plate, is connected to the cutting device and to the adjusting device. The piston is linearly movable within the actuating cylinder. By virtue of this design, an effective possibility is afforded of converting a drive movement into a linear movement for the adjustment of the cutting rail. The actuating cylinder can have on its peripheral surface an, in particular cylindrical, cam, which can be brought into positive engagement with the adjusting device. As a result, the connecting piece is connected in a particularly stable manner to the adjusting device. Actuating cylinders are preferably hydraulic cylinders, i.e. operate with hydraulic oil as the working medium. Pneumatically operated actuating cylinders or electrically driven servo motors can also be used.

In a particularly preferred embodiment, the adjusting device has a pivotable rocker. Through the utilization of a pivot movement for the drive of the cutting unit, in particular lever effects can be made use of. Likewise, that pivot movement of the rocker which is necessary for the drive can be arranged so as to be spatially separate from the region of the comminuted plant material.

The rocker can have a slot-shaped recess, in particular a slot-shaped aperture, in which the connecting piece engages. In this way, a simple guidance and connection of the connecting piece in or to the rocker is configured. The pivot axis of the rocker can here coincide with the transverse direction.

Preferably, the adjusting device has a rotary shaft, which extends in particular in the transverse direction, is rotatable about the transverse direction and is connected in a rotationally secure manner to the rocker. In order to enhance the mechanical stability, the shaft can be held on the housing of the apparatus by a plurality of bearings. As a result of the rotary shaft, an adjustment of the swivel rail realized at one end of same can be transmitted to the other end by means of a laterally arranged actuating cylinder, without the need for synchronization.

In particularly advantageous embodiments, two pivotable rockers are arranged on both outer sides of the rotary shaft that are opposite one another in the transverse direction, which rockers are respectively connected to the cutting device via a connecting piece. In this way, the cutting device, at two places opposite one another in the transverse direction, is mechanically driven, and the point loading of the cutting device in consequence of the drive force is reduced.

In order to avoid mechanical stresses in consequence of an uneven driving of the ends of the cutting rail, at both ends of the cutting rail actuating cylinders or servo motors can also be provided, which produce a constantly equal force in the same direction onto the cutting device. For this purpose, a synchronization device can be provided, so that a force gradient or direction gradient can be compensated. Preferably, this compensation can be effected in a hydraulically or electrically controlled manner.

In another advantageous embodiment, the adjusting device has at least one, in particular stirrup-shaped and pivotable, lever, which is connected in a rotationally secure manner to the rotary shaft, preferably along the whole of the cross section of the rotary shaft. Due to the frictionally locking or positive-locking configuration of the connection of the lever to the rotary shaft, the rotary shaft can be induced by the lever to rotate about its (transverse) axis.

For this purpose, the adjusting device can have an actuating cylinder, which is linearly movable relative to a piston, wherein the actuating cylinder is fixed to the housing and the piston is connected to the lever. The piston and the actuating cylinder are controllable by a user, in particular during operation of the apparatus, so that a movement of the actuating cylinder via the lever causes a rotation of the rotary shaft.

For greater ease of use, the actuating cylinder, at least in some sections, can have a marking, preferably in the form of regular color differences along its length, to which the momentary position of the actuating cylinder relative to the piston is assigned and, during operation, can be viewed by the user of the apparatus from outside, in particular from an operator's cab. In this way, the momentary deflection of the hydraulic piston, which deflection in particular corresponds to the momentary position of the cutting rail, can be viewed by the user from outside, in particular from the operator's cab of a towing vehicle/carrier vehicle, with a minimum amount of effort. The position of the cutting rail can hence be finely adjusted by the user at any time during operation.

Alternatively or additionally thereto, the adjusting device has, instead of a hydraulic actuating cylinder or an electric servo motor, preferably a spindle which is manually actuable by means of a crank, wherein the spindle is connected to the lever. This embodiment is in particular advantageous when the user, during non-operation of the apparatus, wishes to perform a readjustment of the adjusting device by means of the spindle, or does not prefers hydraulic or electrical adjustment.

In another preferred embodiment, the adjusting device has an actuating cylinder, which is mounted in a linearly movable manner relative to a piston. In this embodiment of the adjusting device, the adjustment of the cutting rail is made by means of a linear movement by means of the actuating cylinder or the piston. In this version, the controlling is realized directly by the actuating cylinder or piston.

Alternatively, the actuating cylinder or the piston can be connected to a side wall of the apparatus, in particular to a wall of the housing of the apparatus. In this way, the housing is used as a counter bearing for the actuating cylinder or piston. In a simple embodiment, it is possible the actuating cylinder to be able to be bolted by means of a retaining part to the side wall of the apparatus. The piston and actuating cylinder are then respectively indirectly or directly connected to the cutting rail. The adjustment path of the actuating cylinder and/or its stroke can be presettable by the user through the screwing movement.

Alternatively, the adjusting device can have two actuating cylinders, which are respectively mounted displaceably relative to their piston. Both actuating cylinders can be connected to the cutting device on sides thereof lying opposite each other in the transverse direction, so that a symmetrical structure is obtained. In this embodiment, in order to reduce the shearing forces it is necessary that both actuating cylinders are then subjected to the same force. This can be effected by a synchronization device of the aforementioned type, in particular electrically/hydraulically.

Alternatively to the actuating cylinder or cylinders, correspondingly electrically driven servo motors can—as stated—also be used.

In an extremely preferable embodiment, the apparatus has a position measuring unit for measuring the position of the cutting rail. In this way, the current position of the cutting rail can be measured, and checked by the user, at any time. The position measuring unit can here be configured as a potentiometer, in particular as an angle of rotation potentiometer, by means of which the pivot position of the rocker is measurable. The obtained measurements can be supplied to the user in particular during operation of the apparatus, such that they are viewable by means of a display.

A preferred refinement provides that the cutting device has guide spacers for cleaning of the adjustment path of the cutting rail. The guide spacers run in guide slots of the cutting rail and in this way guide the latter; at the same time, with oblique faces, they clear the guide slots of accumulating dirt.

Further advantages and features of the invention emerge from the claims and the following description, in which illustrative embodiments of the invention are explained in detail with reference to the figures. The various features of novelty which characterize the invention are pointed out with particularity in the claims annexed to and forming a part of this disclosure. For a better understanding of the invention, its operating advantages and specific objects attained by its uses, reference is made to the accompanying drawings and descriptive matter in which preferred embodiments of the invention are illustrated.

BRIEF DESCRIPTION OF THE DRAWINGS

In the drawings:

FIG. 14 is a perspective view showing an alternative embodiment of the adjusting device;

FIG. 15 is a perspective view showing an actuation of the adjusting device of FIG. 14;

FIG. 16 is a perspective view showing an actuation of the adjusting device of FIG. 14; and FIG. 17 is a perspective view showing an actuation of the adjusting device of FIG. 14.

DESCRIPTION OF PREFERRED EMBODIMENTS

Figure 1:
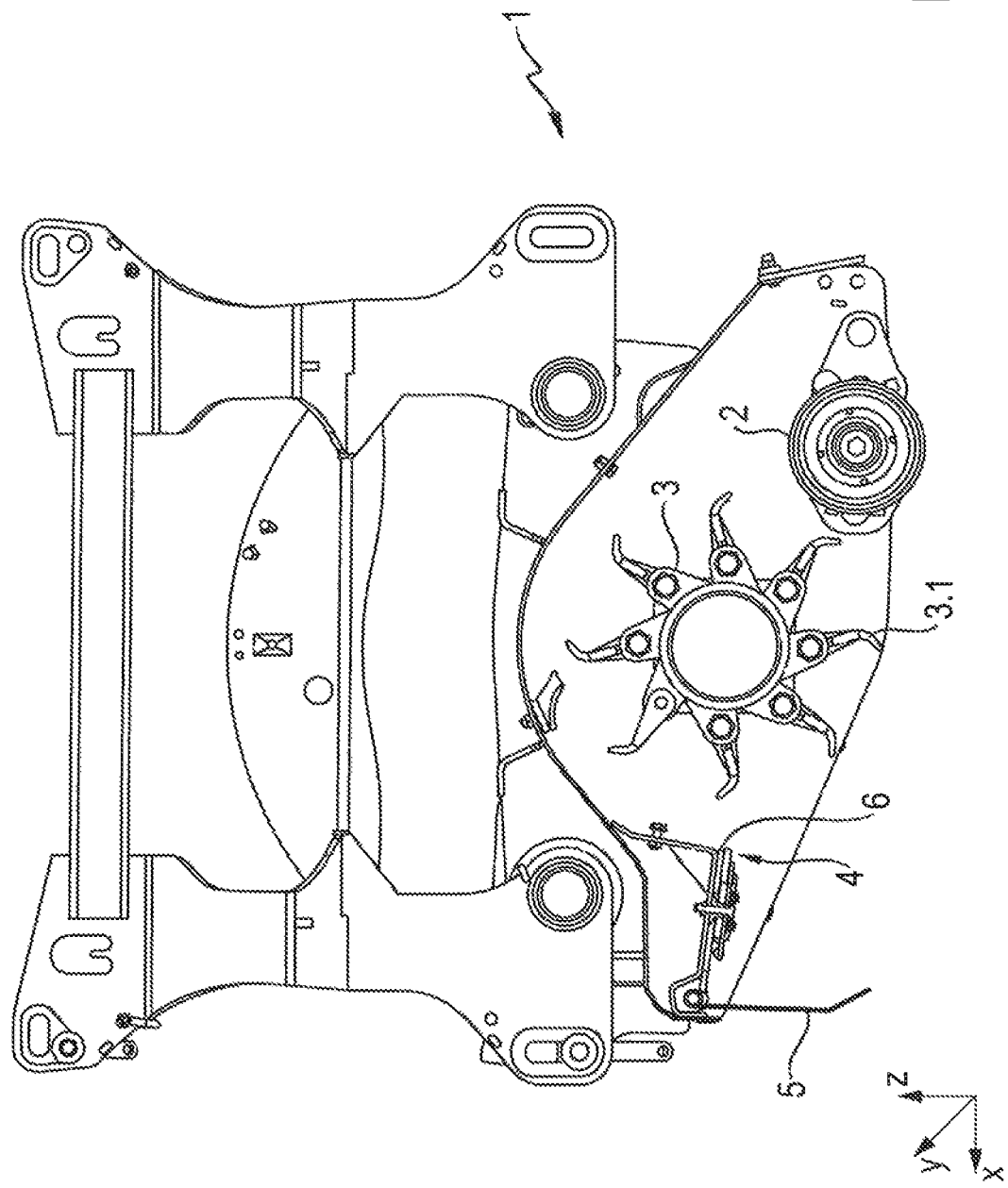
FIG. 1 is a side view showing a working apparatus according to the invention, the side cover of the mulcher housing having been removed.

Referring to the drawings, FIG. 1 shows an agricultural working apparatus 1 according to the invention in the form of a mulcher, which can be coupled in conventional manner to a towing unit, for instance a tractor (not represented). The mulcher 1 has a supporting roll 2, as well as a working rotor 3 with flails 3.1, a cutting device 4, and a pivotable guard plate 5.

When the mulcher 1 moves during operation in the direction of travel X (in FIG. 1 to the left), the working rotor 3, by means of its flails 3.1, separates vegetation to be comminuted, as cutting material, from the soil and leads it past the cutting device 4. The cutting device 4 has in particular a cutting rail 6, which is shown in enlarged representation in FIG. 2 and which extends substantially along the transverse direction Y of the mulcher 1, wherein the transverse direction Y is horizontally directed and lies perpendicular to the direction of travel X of the mulcher 1.

The cutting rail 6 comminutes the separated and collected, or only collected, already previously separated, vegetation, which is thereupon fed, by the rotation movement of the working rotor 3, firstly upward, and then behind the working rotor 3 back down to the soil. The distance of the cutting rail 6 from the working rotor 3 here determines the size of the comminuted cutting material. The cutting rail supports the mulcher 1 with respect to the ground. By means of adjustable baffle plates (not represented) arranged above the transition region between working rotor 3 and supporting roll 2, the cutting material can be deposited in front of the supporting roll 2 or conveyed over it.

Figure 2:
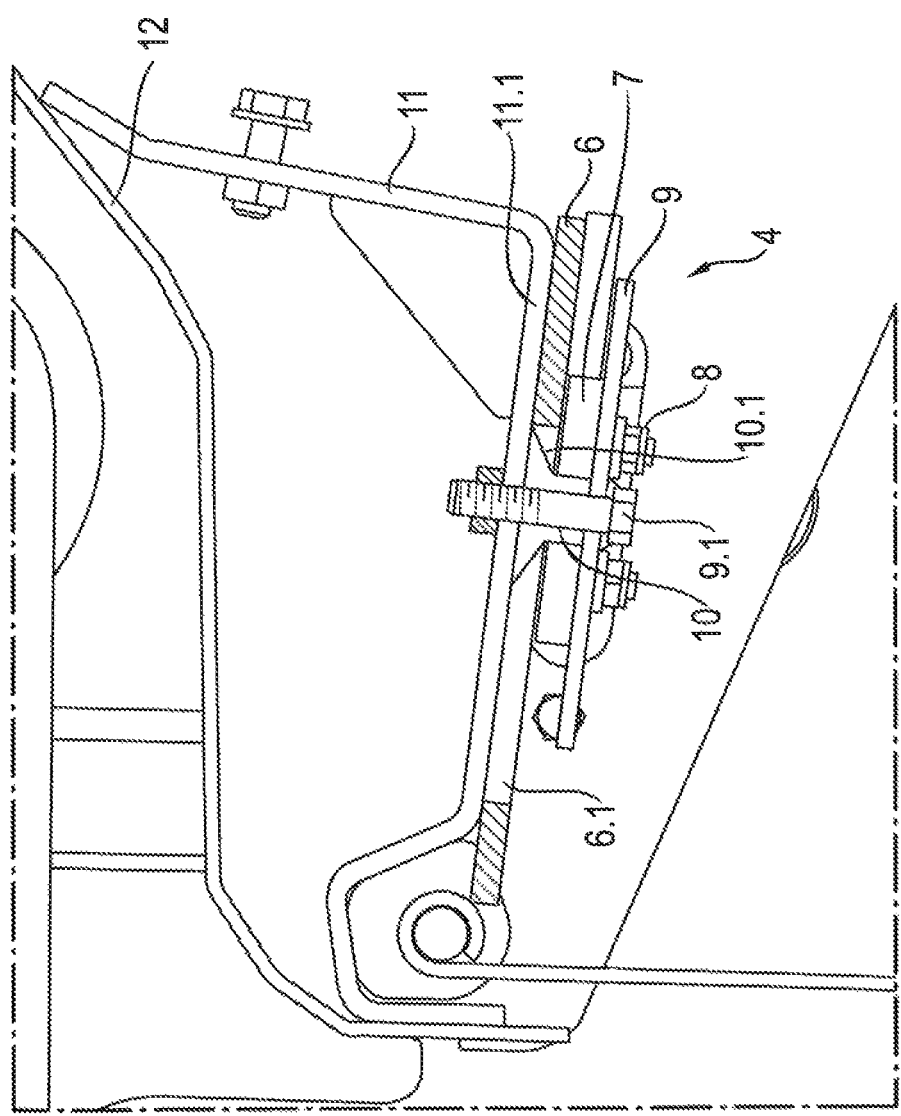
FIG. 2 is an enlarged representation of a cutting device of the apparatus of FIG. 1.

FIG. 2 shows the inventive cutting device 4 of FIG. 1 in enlarged representation. The cutting rail 6 is located at a great distance from the working rotor 3. It is linearly movable substantially counter to and in the direction of travel Y by means of an adjusting device 14 such that the gap between the cutting rail 6 and the working rotor 3 is alterable.

Said cutting rail is connected by means of screws 8 to the angle profile 11 such that it can slide between a lower leg 11.1 of an angle profile 11 and a housing-fixed slide plate 7. Between the slide plate 7 and heads of the screws 8, counter plates 9 are provided. The aforementioned parts are held on the angle profile by screws 9.1.

Guide spacers 10 surround the screws a 9.1. They run in guide slots, provided for this purpose, of the cutting rail 6 and in this way guide the latter; at the same time, with oblique faces 10.1, they clear the guide slots of accumulating dirt.

Figure 3:
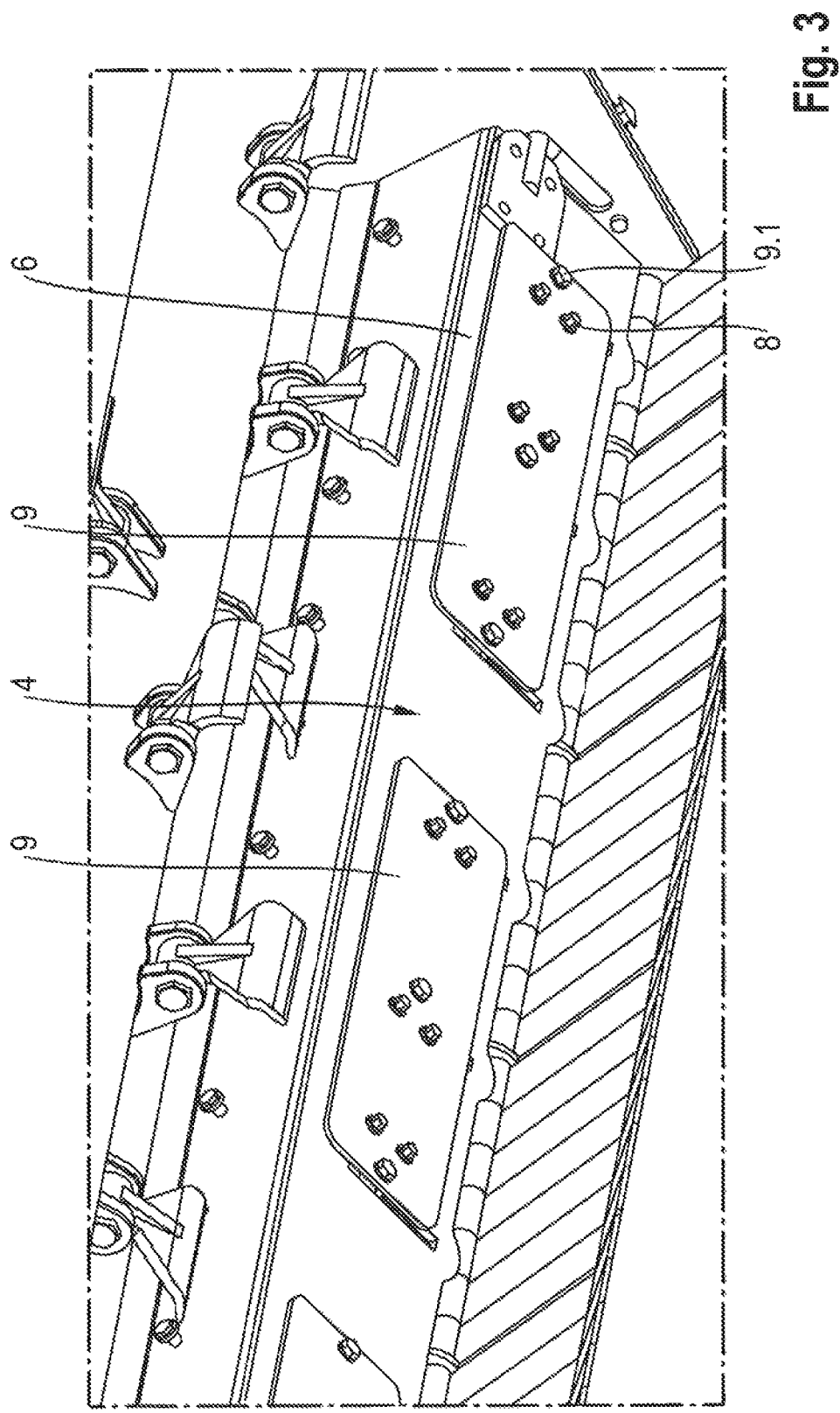
FIG. 3 is a perspective view, from obliquely below, showing the cutting device of FIG. 2.

FIG. 3 shows the cutting unit 4 of FIG. 2 in a view from obliquely below. Over the whole of the width of the cutting rail 6, counter plates 9, which are mutually aligned in the transverse direction Y and are held by the screws 10, are arranged beneath the cutting rail 6.

Figure 4:
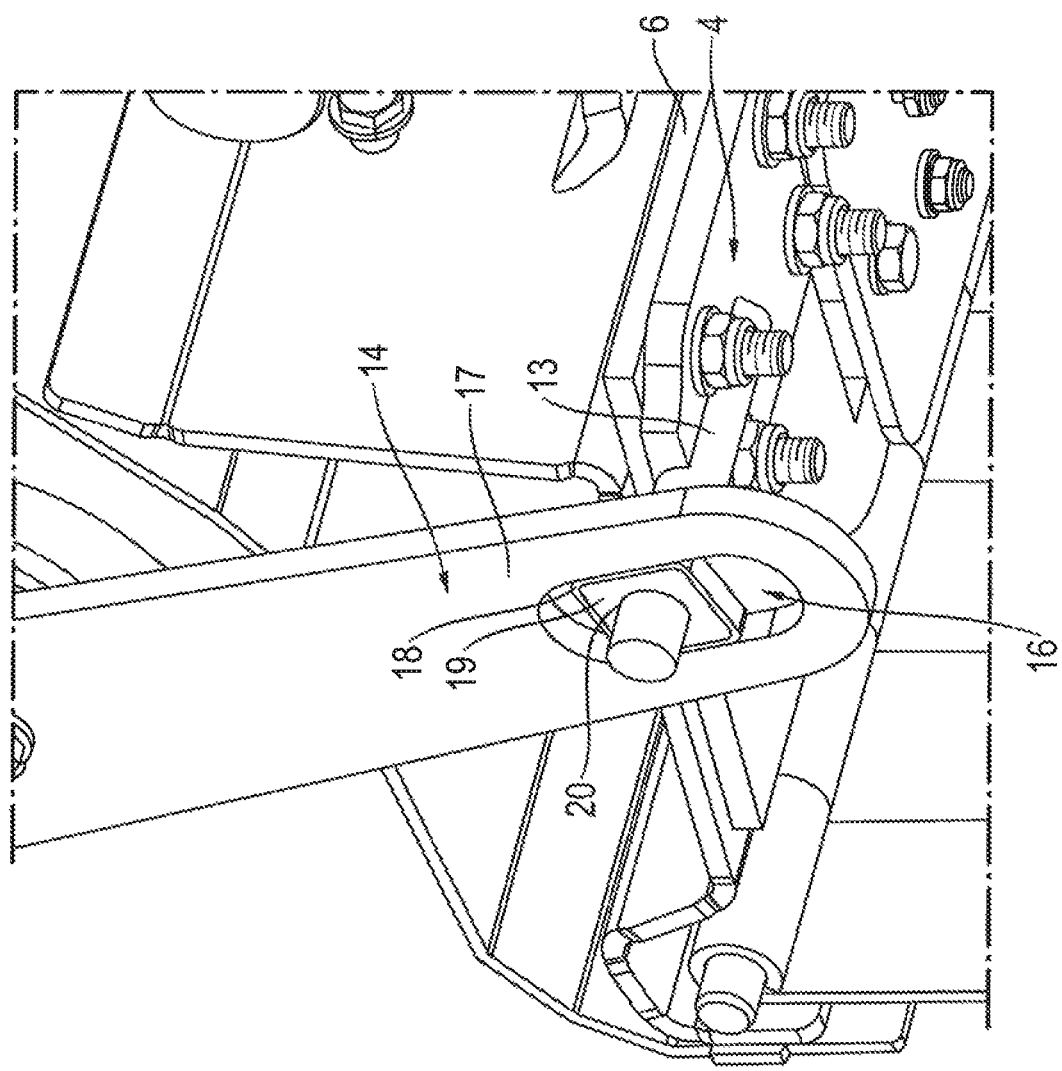
FIG. 4 is an enlarged perspective representation of the cutting device with connecting piece and adjusting device.

In FIG. 4, the connection of the cutting device 4 to an adjusting device 14 by means of a connecting piece 13 is represented. The connecting piece 13 is configured as a bolt, which is fixedly connected to the cutting device 4. On its side facing away from the cutting device 4, the bolt 13 reaches through a slot-shaped recess 16 of the adjusting device 14, which latter has a rocker 17 pivotable about the transverse direction Y.

Between the bolt 13 and that wall of the rocker 17 which surrounds the recess 16 are arranged a sliding block 18 and a spring element 19. The spring element 19 is an enclosure of the sliding block 18, made of an elastic material (plastic), and serves to cushion relative movements between the bolt 13 and the rocker 17. The sliding block 18 enables a low-friction guidance of the bolt 13 within the recess 16 of the rocker 17.

If the rocker 17 is pivoted about the transverse direction Y, the bolt 13 moves linearly within the slot-shaped recess 16 and in this way effects an adjustment of the cutting device 4, counter to or in the direction of travel X, toward the working rotor 3 or away from this.

Figure 5:
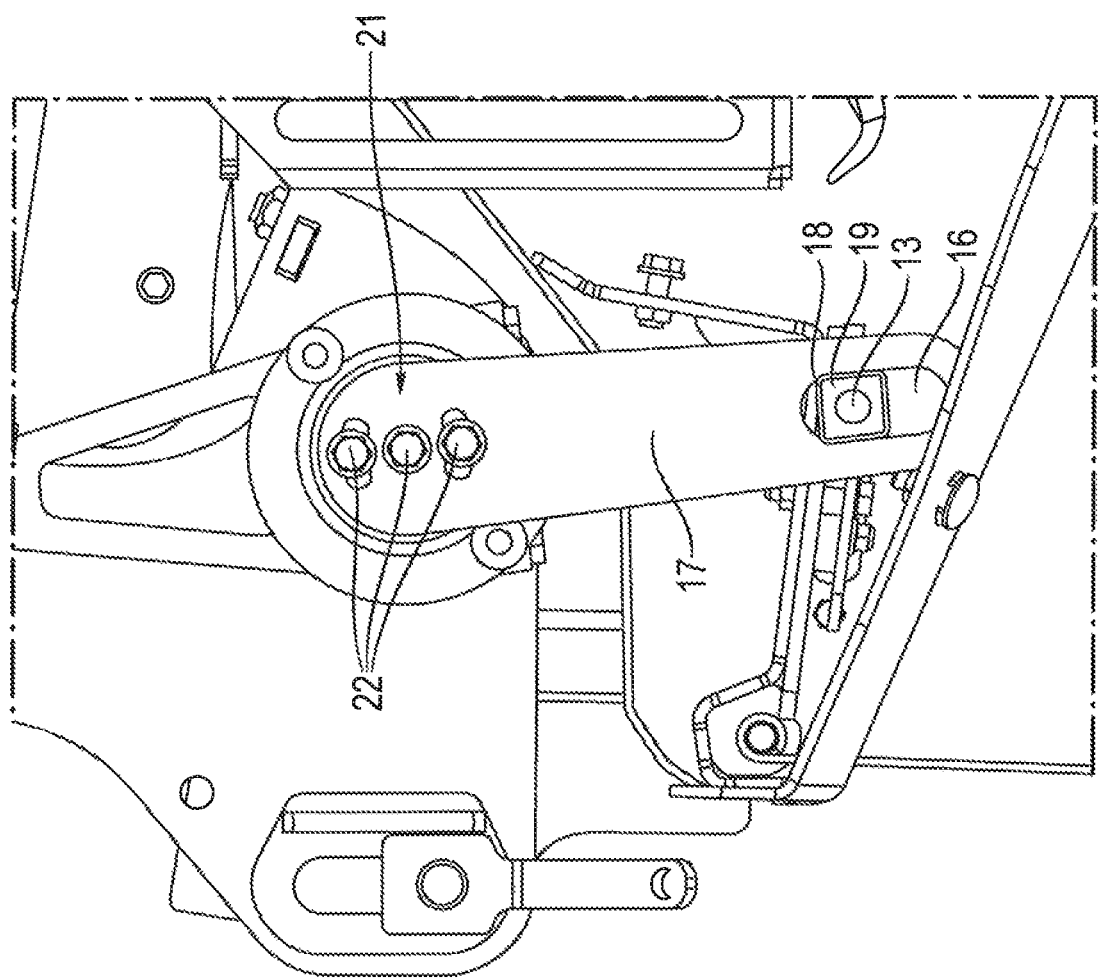
FIG. 5 is a further side view of the adjusting device.

FIG. 5 shows a representation, similar to FIG. 4, of the adjusting device with further components of same. It can be seen that the rocker 17, at a region 21 facing away from the bolt 13, is connected by means of three screws/rivets 22 in a rotationally secure manner to a rotary shaft 23 (not visible in FIG. 5). The slots of the rocker 17, through which the lower and the upper screws reach, enable the basic orientation of the rocker 17 relative to the rotary shaft 23 to be fixedly set. From FIG. 9 it can be seen that the cutting rail 6, at its other end, is likewise in the same way connectable to the rotary shaft 23 via a rocker 17, with the sole difference given here that the bolt 13 reaches directly through the appropriate slot 16 of the rocker 17 without the interposition of a sliding block—which in principle, however, can likewise be provided.

Figure 6:
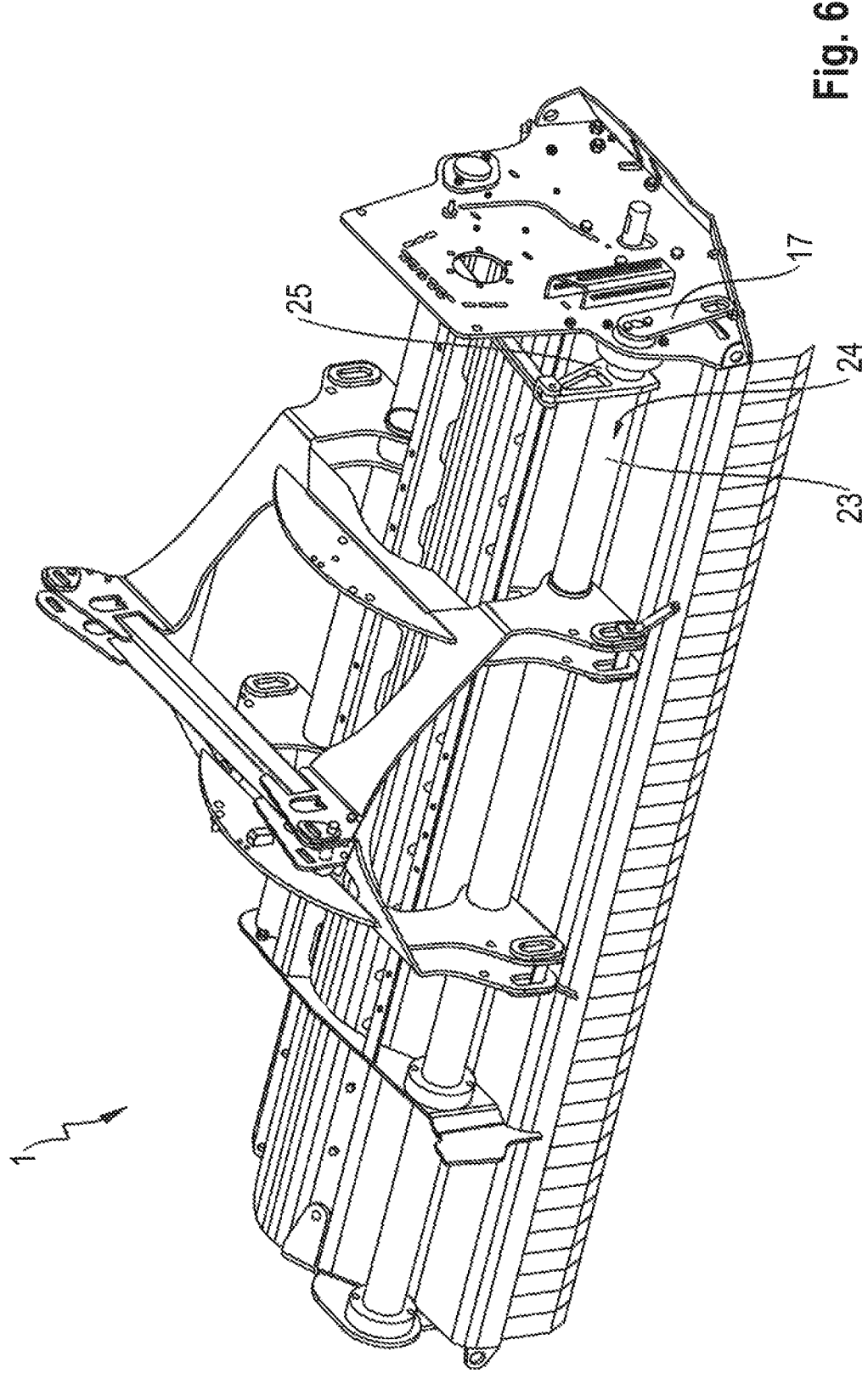
FIG. 6 is a perspective view, from obliquely above, showing an overall view of the adjusting device.

FIG. 6 shows the working apparatus 1 in a representation from obliquely above. The rotationally secure connection of the rocker 17 to the transversely extending rotary shaft 23 can be seen. The rotary shaft 23 is rotatable about the transverse direction Y and extends in its longitudinal direction over the width of the working apparatus 1. At that end, region 24 of the rotary shaft 23 which is facing toward the rocker 17, a stirrup-shaped lever 25 is connected in a rotationally secure manner to the rotary shaft 23.

Figure 7:
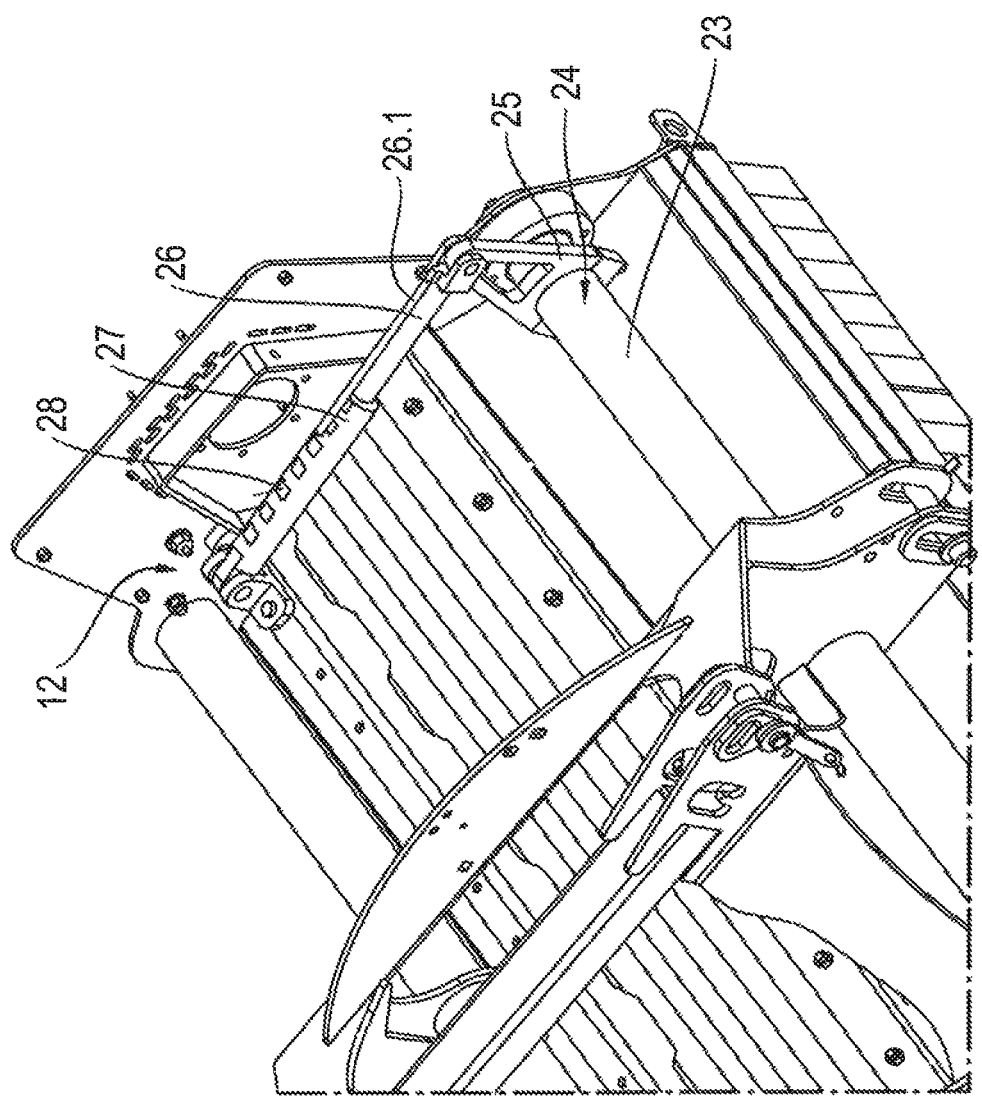
FIG. 7 is an enlarged perspective representation of the adjusting device of FIG. 6.

FIG. 7 shows the lever 25 in enlarged representation from obliquely above. The lever 25 has a two-part configuration, by means of which the rotary shaft 23 is encompassed in a rotationally secure manner along the whole of its cross section. On that side of the lever 25 which is facing away from the rotary shaft 23, the lever 25 is articulately connected to a piston 26 of an actuating cylinder 27 and is pivotable by means of same. The actuating cylinder is preferably a hydraulic cylinder; the working medium is thus hydraulic oil. The piston 26 is guided in a linearly movable manner in the hydraulic cylinder 27. The hydraulic cylinder 27 is fixedly connected to the housing 12. The actuating cylinder 27 has on its peripheral surface 28 a scale, which is arranged under a rod 26.1 which is connected to the free end of the piston 26, moves backward over the hydraulic cylinder and indicates the motional state of the piston 26 in the actuating cylinder 27. The scale 28 is viewable from outside by the operator during operation of the mulcher 1.

During operation of the mulcher 1, the operator can, via a remote control (not shown), actuate the actuating cylinder 27, linearly move the piston 26, which manifests itself in a pivot movement of the lever 25 about the rotary shaft 23. The rotary shaft 23 itself is thereby set in rotation about the transverse direction Y, whereby the rocker 17 is pivoted about the transverse direction Y. As already described, the bolt 13, and with it the cutting device 4, is thereby moved linearly such that the distance of the cutting rail 6 in relation to the working rotor 3 is altered.

Figure 8:
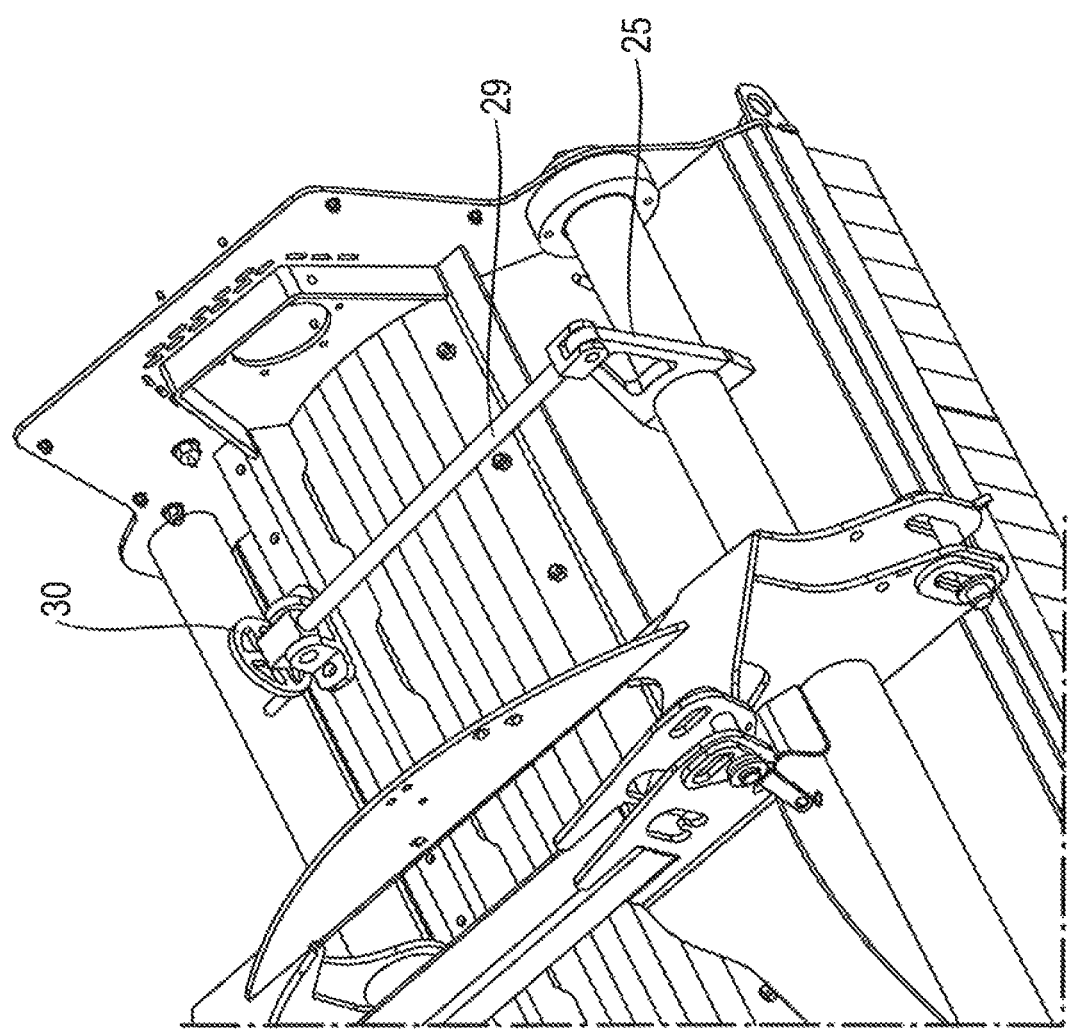
FIG. 8 is a perspective view showing a further embodiment of the adjusting device of FIG. 7.

FIG. 8 shows another embodiment of the motional capability of the lever 25, in which, instead of the hydraulic cylinder 27 with the piston 26, a longitudinally adjustable spindle 29, which at its one end is articulately connected to the lever 25 and at its other end has a manually actuable crank 30, is provided. In this embodiment, the adjustment of the pivot mechanism by means of the crank 30 can be performed by the operator/user only at standstill. If the crank 30 is actuated, the notching of the spindle changes, which in turn produces a movement of the lever 25 and which ultimately, as already described, manifests itself in a displacement of the cutting rail 6.

Figure 9:
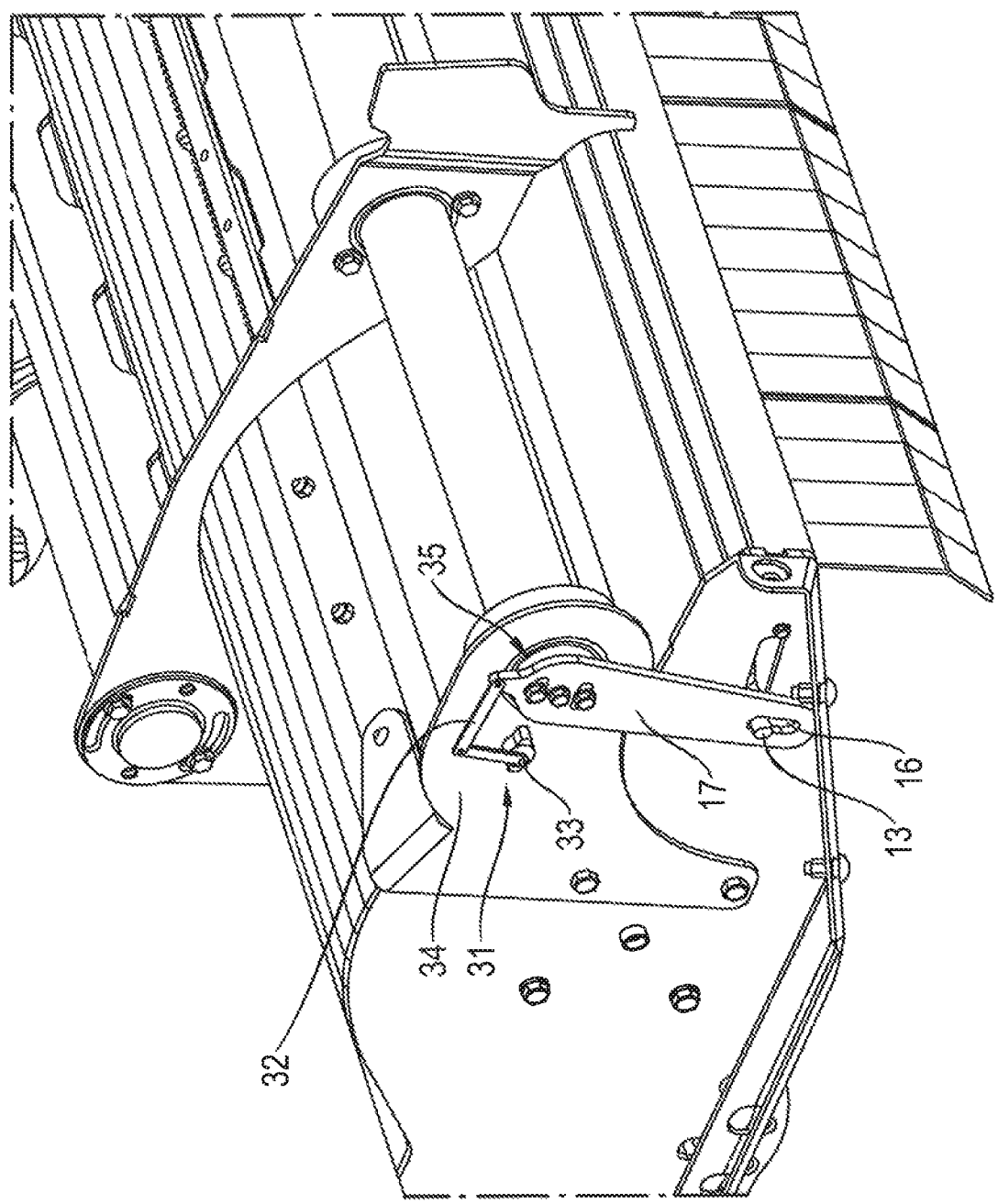
FIG. 9 is a perspective view showing a further embodiment of the adjusting device.

FIG. 9 shows an alternative determination of the starting position of the cutting rail 6. For this purpose, a position measuring device 31 is arranged alongside the rocker 17 and connected to the rocker 17 by means of a hinged bracket 32. The position measuring device 31 is configured, for instance, as a rotary potentiometer 33 and is fastened on an outer retaining plate 34. Furthermore, the outer retaining plate 34 has a recess 35, which is reached through by the rotary shaft 23. By means of the rotary potentiometer 33, the state of pivoting of the rocker 17 can be electronically measured at any time and is displayed to the operator/user in the operator's cab via an appropriate instrument.

Figure 10:
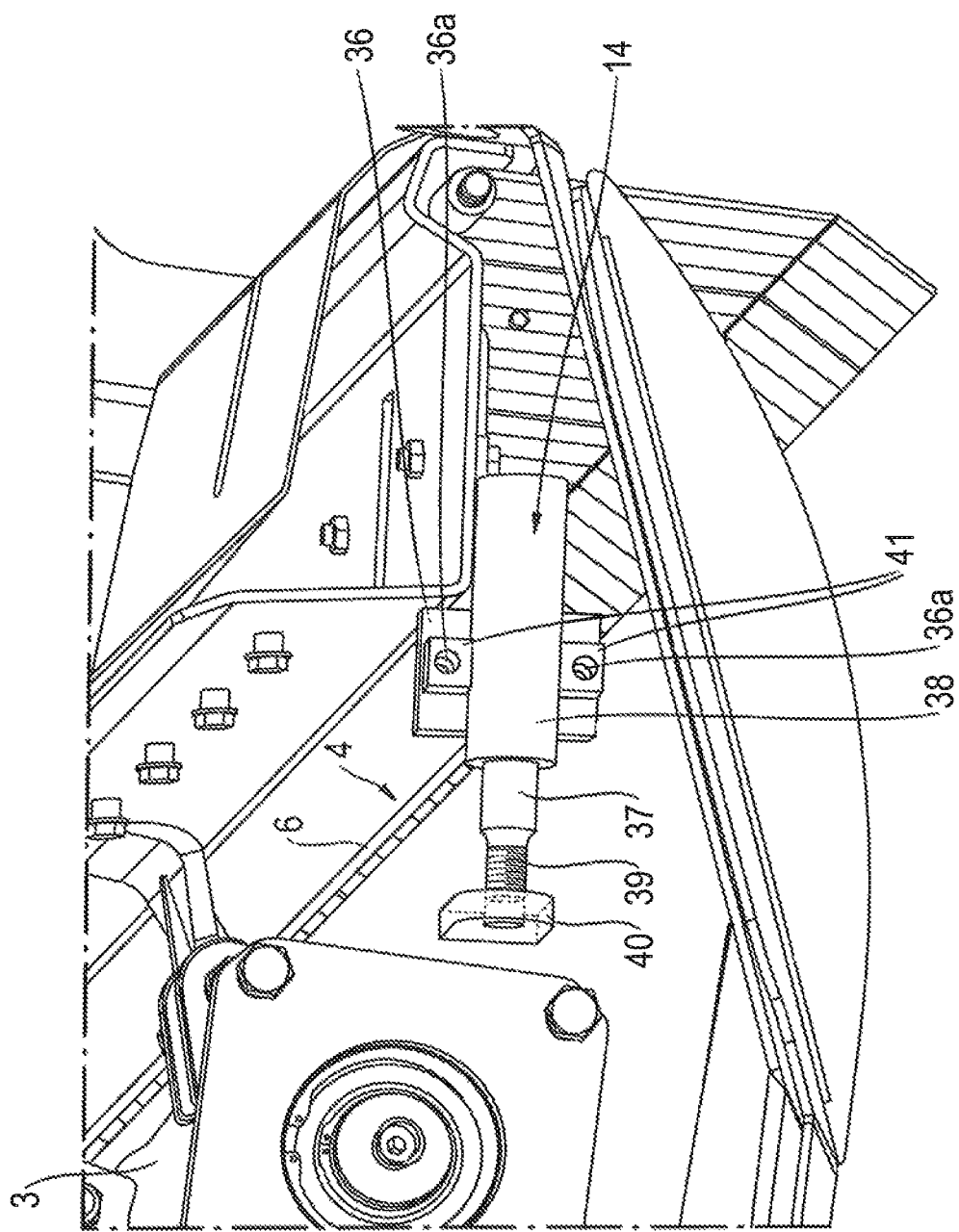
FIG. 10 is a side perspective view showing a further embodiment of the adjusting device according to the invention.

FIG. 10 shows a further embodiment of the working apparatus 1 according to the invention in a view from obliquely above and from outside, wherein the outer wall of the mulcher housing 12 is represented transparently in order to liberate the view of the interior of the housing 12. In the left-hand region of FIG. 10 can be seen the working rotor 3, at a distance from which is arranged the cutting rail 6 of the cutting device 4. Onto an end region of the cutting rail 6 that is situated laterally in the transverse direction Y, a connecting piece corresponding to the connecting piece 13 of the above-described embodiment and in the form of an adapter plate 36 is molded perpendicular to the direction of principal extent of the cutting rail 6. The adapter plate 36 has two threaded holes 36a, which serve to fasten the cutting device 4 to the adjusting device 14.

The adjusting device 14 is preferably configured, as represented in FIG. 10, as a hydraulic cylinder 38 with piston 37, wherein the hydraulic piston 37 is guided in a linearly movable manner in the actuating cylinder 38. At its end facing away from the actuating cylinder 38, the piston 37 has a thread 39, with which the hydraulic piston 37 is fixed in a mounting 40 fixedly attached to the inner wall (not represented in FIG. 10) of the mulcher housing 12.

The actuating cylinder 38 has, level with the holes 36a, two threaded fastening elements 41, which are configured as plates and by means of which the actuating cylinder 38 can be fastened to the adapter plate 36. In this embodiment, the piston 37 is thus fixed to the housing and the hydraulic cylinder 38 is arranged movably with the cutting rail 6. The reverse arrangement can also be chosen.

Upon actuation of the actuating cylinder 38 by means of an actuating apparatus (not represented in FIG. 10) in the cab of the vehicle to which the apparatus 1 is coupled, the actuating cylinder 38 moves linearly along the direction of travel X or counter thereto and, by means of its connection to the adapter plate 36, causes the cutting rail 6 of the cutting device 4 to make a synchronous movement.

By means of the screwing facility of the hydraulic piston 37 in the mounting 40 on the mulcher housing 12, both the starting position and the stroke of the actuating cylinder 38 can be set by the user prior to start-up of the apparatus 1. In this embodiment, the adjusting device respectively has a hydraulic cylinder 38 with piston 37 at each end of the cutting rail 6; i.e. two hydraulic cylinders with pistons are provided in total.

A synchronous running of the hydraulic cylinders can be effected hydraulically, in that one of the cylinders serves as master and the other as slave.

The synchronous running can also be effected via sensors and actuators via an—electrical—control system.

Figure 11:
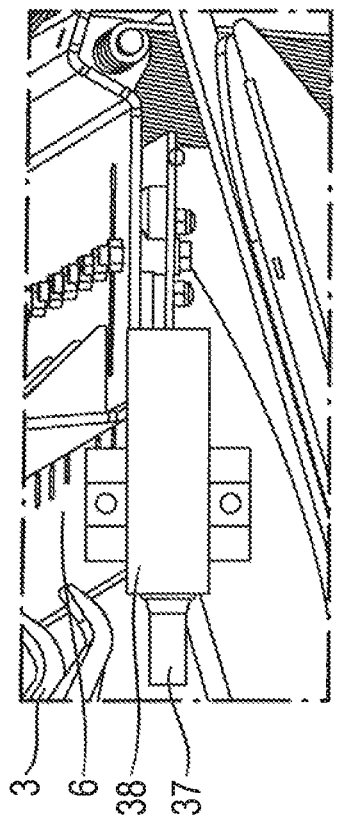
FIG. 11 is a perspective view showing an actuation of the adjusting device of FIG. 10.
Figure 12:
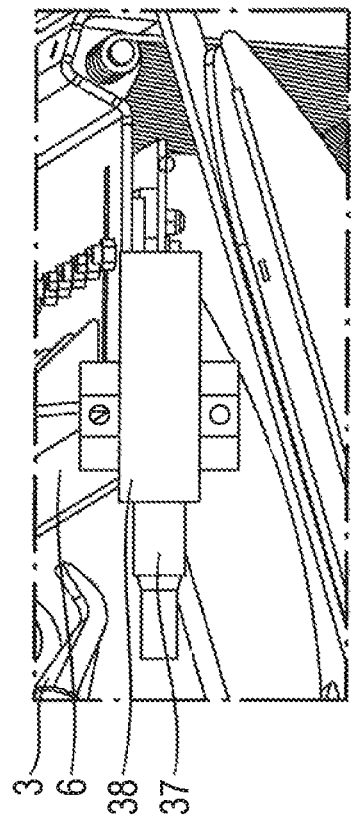
FIG. 12 is a perspective view showing an actuation of the adjusting device of FIG. 10.
Figure 13:
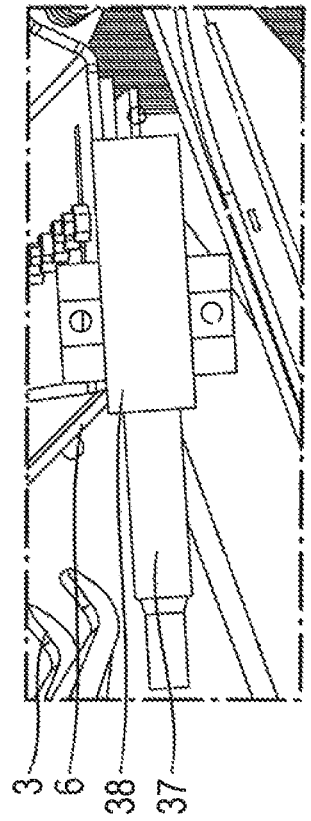
FIG. 13 is a perspective view showing an actuation of the adjusting device of FIG. 10.

The working method of the embodiment represented in FIG. 10 is represented in FIGS. 11 to 13. FIG. 11 shows the one actuating cylinder 38 in a position in which it is moved maximally to the left toward the working rotor, so that the piston 37 is located largely in the hydraulic cylinder 38. In this position, the cutting rail 6 is maximally extended and the distance between the cutting rail 6 and the working rotor 3 is minimal Upon actuation of the actuating cylinders 38, these move, in the transition from FIGS. 11 to 13, linearly to the right, whereby the cutting rail 6 is steplessly retracted until the actuating cylinders 38 in FIG. 13 reach their maximally deflected position and the cutting rail 6 is maximally retracted.

FIG. 14 shows a further embodiment of the apparatus according to the invention in a similar view to FIG. 10. As in the previous illustrative embodiment, the cutting rail 6 has, on its end region situated laterally in the transverse direction, an adapter plate 36 which is provided with holes 36a and which is fastened to a hydraulic cylinder 38a. The hydraulic cylinder 38a is likewise linearly movable relative to its piston 37a, which is fastened between two brackets 41 fastened to the mulcher housing 12 (not represented). Onto a part of the peripheral surface of the hydraulic cylinder 38a that is facing toward the mulcher housing 12 is molded a cylindrical projection 42, which, similarly to the first construction variant already shown, reaches through the recess 16 of the pivotable rocker 17 arranged to the side of the cutting rail 6. The rocker 17 is here, as already shown, connected in a rotationally secure manner to the transversely running rotary shaft 23.

In the illustrative embodiment shown in FIG. 14, the actuating cylinder 38a is passively driven by means of the rocker 17 and is not directly controllable. In the illustrative embodiment shown in FIG. 14, a forced guidance is realized at the ends of the cutting rail via a rotary shaft, either purely mechanically by means of a spring-mounted sliding block, as described above in the embodiment of FIGS. 1 to 9 with reference to these, or by means of a forced synchronization of hydraulic cylinders, arranged at both ends of the cutting rail 6 and the rotary shaft, via the rotary shaft. The movement of the hydraulic cylinder 38a, and hence of the cutting rail 6, is represented in FIGS. 15 to 17. In FIG. 15, the cutting rail 6 is shown in its maximally retracted position, and the hydraulic cylinder 38a is located deflected maximally to the right, wherein a right angle 41 shown in FIG. 15 serves as a stop for the hydraulic cylinder 38a. A lateral cam 42 on the hydraulic cylinder 38a engages in a slot 16 of the rocker 17 and is located at the upper end of the slot 16 of the rocker 17. If the hydraulic cylinder is moved, it pivots the rocker 17 and the rotary shaft jointly about the transverse direction Y, whereby the lower end of the cutting rail is carried along. The movement is represented in the transition from FIG. 15 to FIG. 17. The cam 42 moves downward in the slot 16. As a result of the movement of the hydraulic cylinder 38a, the cutting rail 6 moves in the direction of travel X forward toward the working rotor (not represented). The maximally extended position of the cutting rail 6 is shown in FIG. 17, in which the hydraulic cylinder 38a is moved maximally to the left. The angle bracket 41 arranged on the left in FIG. 17 serves as a stop for this position. The cam 42 of the hydraulic cylinder 38a is located at the lower end of the slot-shaped recess 16 of the rocker 17. In all movement operations, the setting piston 37a remains clamped between both brackets 41.

While specific embodiments of the invention have been shown and described in detail to illustrate the application of the principles of the invention, it will be understood that the invention may be embodied otherwise without departing from such principles.

What is claimed is:

1. An agricultural working apparatus for the processing of biomass including plant parts and for mulching, a mulching-mowing apparatus or a milling apparatus, the apparatus comprising:
   a cutting device comprising a cutting rail and a connecting piece;
   an adjusting device for an adjustment of the cutting rail, wherein the connecting piece of the cutting device is arranged laterally in a transverse direction and the cutting rail is connected to the adjusting device by the connecting piece;
   wherein the connecting piece comprises a bolt fixed on the cutting rail and engaging in a depression or a recess of the adjusting device, the connecting piece further comprises a sliding block; and in the depression, the sliding block is arranged between the bolt and the adjusting device, and the sliding block comprises a spring element, the spring element being an enclosure of the sliding block and made of an elastic material.

2. The apparatus as claimed in claim 1, wherein the adjusting device comprises a pivotable rocker.

3. The apparatus as claimed in claim 2, wherein the rocker comprises a slot-shaped recess forming a slot-shaped aperture in which the connecting piece engages.

4. The apparatus as claimed in claim 2, wherein the adjusting device further comprises a rotary shaft, which extends in the transverse direction, is rotatable about the transverse direction and is connected rotationally secure to the rocker.

5. The apparatus as claimed in claim 4, wherein the adjusting device further comprises a lever, which is connected rotationally secure to the rotary shaft along a whole of a cross section of the rotary shaft, the lever being stirrup-shaped and pivotable in configuration.

6. The apparatus as claimed in claim 5, wherein the adjusting device further comprises a actuating cylinder, in which a piston is arranged such that the piston is linearly movable, the actuating cylinder being connected to the lever and the piston being fixed to a housing.

7. The apparatus as claimed in claim 6, wherein the actuating cylinder, at least in some sections, has a marking in the form of regular color differences along an actuating cylinder length, to which a momentary position of the actuating cylinder relative to the piston is assigned and, during operation, can be viewed by a user of the apparatus.

8. The apparatus as claimed in claim 5, wherein the adjusting device further comprises a spindle connected to the at least one lever and a crank, wherein the spindle is manually actuable by means of the crank.

9. The apparatus as claimed in claim 1, wherein the adjusting device comprises at least one actuating cylinder, in which respectively a piston is displaceably mounted.

10. The apparatus as claimed in claim 9, further comprising a housing, wherein the actuating cylinder is fixed to the housing.

11. The apparatus as claimed in claim 1, further comprising a position measuring unit for measuring a position of the cutting rail.

12. The apparatus as claimed in claim 11, wherein
the adjusting device comprises a pivotable rocker;
the position measuring unit is configured as a potentiometer comprising an angle of rotation potentiometer, by means of which a pivot position of the rocker is measurable.

13. The apparatus as claimed in claim 12, wherein the cutting device has guide spacers for cleaning an adjustment path of the cutting rail.

14. An agricultural working apparatus for the processing of biomass including plant parts and for mulching, a mulching-mowing apparatus or a milling apparatus, the apparatus comprising:
a cutting device comprising a cutting rail and a connecting piece;
an adjusting device for an adjustment of the cutting rail, wherein the connecting piece of the cutting device is arranged laterally in a transverse direction and the cutting rail is connected to the adjusting device by the at least one connecting piece;
wherein the adjusting device comprises a pivotable rocker,
wherein the adjusting device further comprises a rotary shaft, which extends in the transverse direction, is rotatable about the transverse direction and is connected rotationally secure to the rocker, and a lever, which is connected rotationally secure to the rotary shaft along a whole of a cross section of the rotary shaft, the lever being stirrup-shaped and pivotable in configuration,
wherein the adjusting device further comprises an actuating cylinder, in which a piston is arranged such that the piston is linearly movable, the actuating cylinder being connected to the lever and the piston being fixed to a housing, and
wherein the actuating cylinder, at least in some sections, has a marking in the form of regular color differences along an actuating cylinder length, to which a momentary position of the actuating cylinder relative to the piston is assigned and, during operation, can be viewed by a user of the apparatus.

15. The apparatus as claimed in claim 14, wherein the connecting piece comprises a bolt fixed on the cutting rail and engaging in a depression or a recess of the adjusting device.

16. The apparatus as claimed in claim 15, wherein:
the connecting piece further comprises a sliding block; and
in the depression the sliding block is arranged between the bolt and the adjusting device.

17. The apparatus as claimed in claim 16, wherein the sliding block comprises a spring element, the spring element being an enclosure of the sliding block and made of an elastic material.

18. The apparatus as claimed in claim 14, wherein the connecting piece further comprises an adapter plate connected to the adjusting device.

19. The apparatus as claimed in claim 18, wherein the connecting piece further comprises an actuating cylinder or servo motor comprising a piston connected to the cutting device and to the adjusting device by means of the adapter plate.

20. The apparatus as claimed in claim 14, wherein the rocker comprises a slot-shaped recess forming a slot-shaped aperture in which the connecting piece engages.

21. The apparatus as claimed in claim 14, further comprising a position measuring unit for measuring the position of the cutting rail.

22. The apparatus as claimed in claim 21, wherein the position measuring unit is configured as a potentiometer comprising an angle of rotation potentiometer, by means of which a pivot position of the rocker is measurable.

23. The apparatus as claimed in claim 22, wherein the cutting device has guide spacers for cleaning an adjustment path of the cutting rail.

* * * * *